Figure 1:
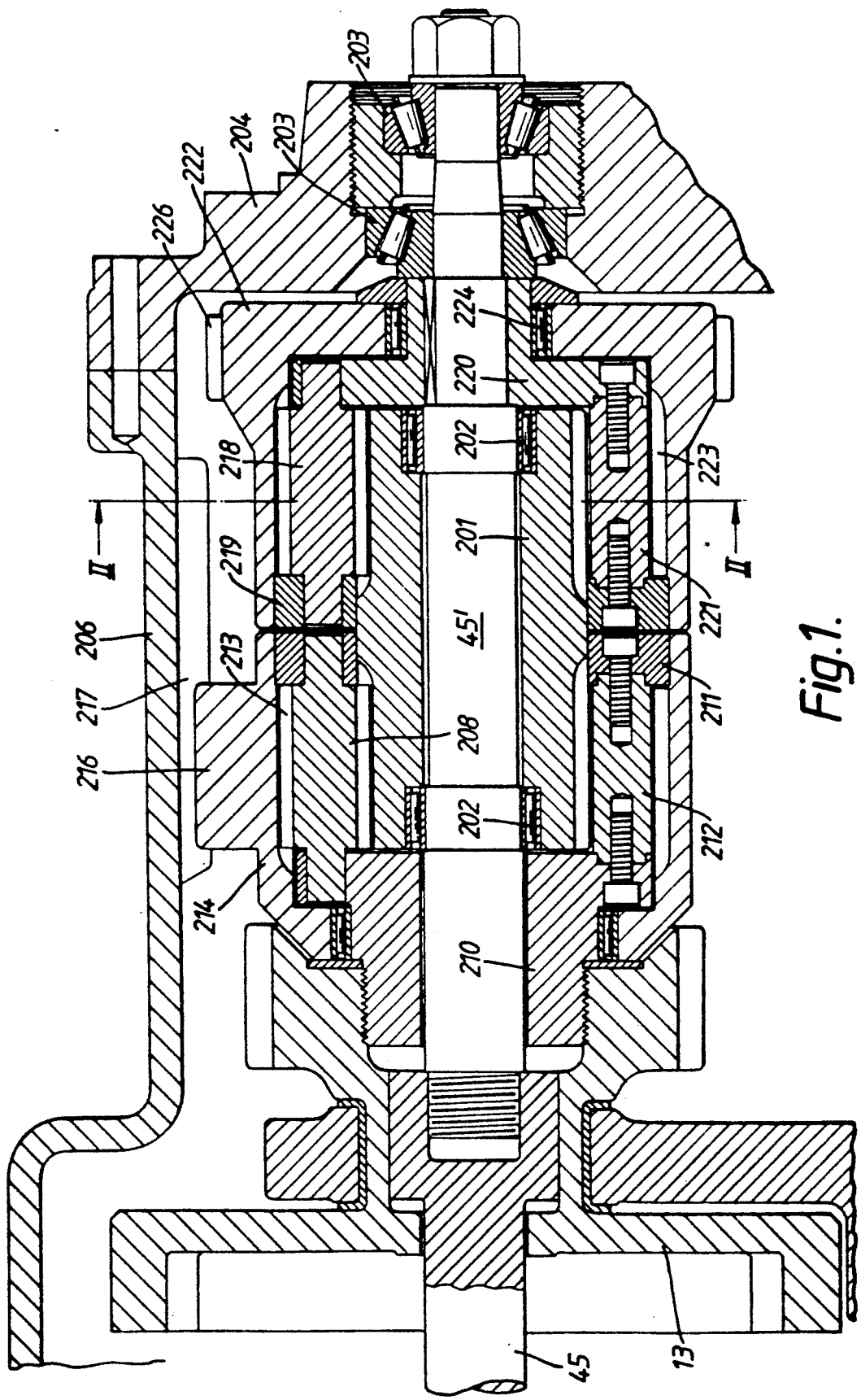

United States Patent
Egan

[11] Patent Number: 5,167,594
[45] Date of Patent: Dec. 1, 1992

[54] DYNAMIC PHASE COUPLING

[76] Inventor: Michael J. Egan, 28 Fords Rd., Wollongong, NSW 2515, Australia

[21] Appl. No.: 773,666
[22] PCT Filed: Mar. 1, 1990
[86] PCT No.: PCT/GB90/00319
§ 371 Date: Oct. 23, 1991
§ 102(e) Date: Oct. 23, 1991
[87] PCT Pub. No.: WO90/10142
PCT Pub. Date: Sep. 7, 1990

[30] Foreign Application Priority Data
Mar. 1, 1989 [GB] United Kingdom ............... 8904640

[51] Int. Cl.⁵ ............. F16H 35/06; F16H 35/08; F16D 3/10
[52] U.S. Cl. ............. 475/330; 74/395; 74/400; 74/401; 74/665 N; 475/218; 475/219; 475/290; 475/329; 475/349
[58] Field of Search ......... 74/395, 400, 401, 664, 74/665 R, 665 L, 665 N, 665 P, 665 S, 840; 475/218, 219, 270, 290, 317, 329, 330, 337, 349

[56] References Cited

U.S. PATENT DOCUMENTS

| | | | |
|---|---|---|---|
| 1,508,885 | 9/1924 | Jennings | 475/290 |
| 2,245,075 | 6/1941 | Mingle | 74/395 |
| 3,301,093 | 1/1967 | Ewert | 74/665 N X |
| 3,728,912 | 4/1973 | Darnell | 475/290 |
| 4,694,708 | 9/1987 | Hartmann | 475/349 X |
| 4,856,370 | 8/1989 | Stidworthy | 475/9 X |
| 4,922,790 | 5/1990 | Abbott et al. | 74/395 X |
| 4,951,518 | 8/1990 | Hendershot | 74/395 |

FOREIGN PATENT DOCUMENTS

| | | | |
|---|---|---|---|
| 143368 | 6/1985 | European Pat. Off. | |
| 1134821 | 4/1957 | France | 475/290 |
| 521032 | 3/1955 | Italy | 475/290 |
| 8703715 | 6/1987 | PCT Int'l Appl. | |
| 8805009 | 7/1988 | PCT Int'l Appl. | |
| 428779 | 5/1935 | United Kingdom | 475/290 |

*Primary Examiner*—Richard Lorence
*Assistant Examiner*—David E. Henn
*Attorney, Agent, or Firm*—Watson, Cole, Grindle & Watson

[57] ABSTRACT

An actuating mechanism for adjusting the angular relationship of co-axial primary and second drives while both are running comprises a double planetary gear train having a freely rotatable common sun gear (201) and first and second ring gears (213, 223) rotatable relative to each other and each coupled to the sun gear by respective sets of caged planet gears (208, 218). One ring gear (213) is normally held against rotation and the other (223) is adjustable relative thereto. The gear cages are fast with the respective drives.

2 Claims, 2 Drawing Sheets

DYNAMIC PHASE COUPLING

This invention relates to actuating mechanisms for adjusting the angular relationship of two co-axial shafts while both are driven in unison.

The invention has particular, but not exclusive, application to variable ratio drive transmissions, for example of the form described and illustrated in our co-pending patent application PCT GB 89/00473. In that case, the eccentricity of one or more connecting rods is regulated by an operating shaft extending co-axially through the crankshaft. The operating shaft is driven in unison with the crank shaft, but adjustment of its angular position relative to the crankshaft is adjustable, while the crankshaft is running.

In accordance with a feature of the invention, there is provided an actuating mechanism comprising a primary and a secondary planetary gear train, each train comprising a set of planet gears mounted in a cage and inner and outer concentric gears (comprising a sun gear and a ring gear) and wherein the primary and secondary drive are fast with the respective cages of the primary and secondary gear trains, one concentric gear of each train is fast with the corresponding concentric gear of the other train and is freely rotatable therewith, while the other concentric gears of trains are normally held against rotation, one of them being angularly adjustable relative to the other to transmit a corresponding angular adjustment to the secondary drive.

With this arrangement, the primary drive member and the secondary shaft normally rotate in unison, but their relative angular positions can be adjusted, without interrupting their rotation, by adjusting the angular position of the otherwise stationary concentric gear of the secondary train. This adjustment can be effected without any shock loading and the mechanism is free of any out-of-balance forces which might cause undue vibration both during normal running and in the course of adjustment.

Figure 2:
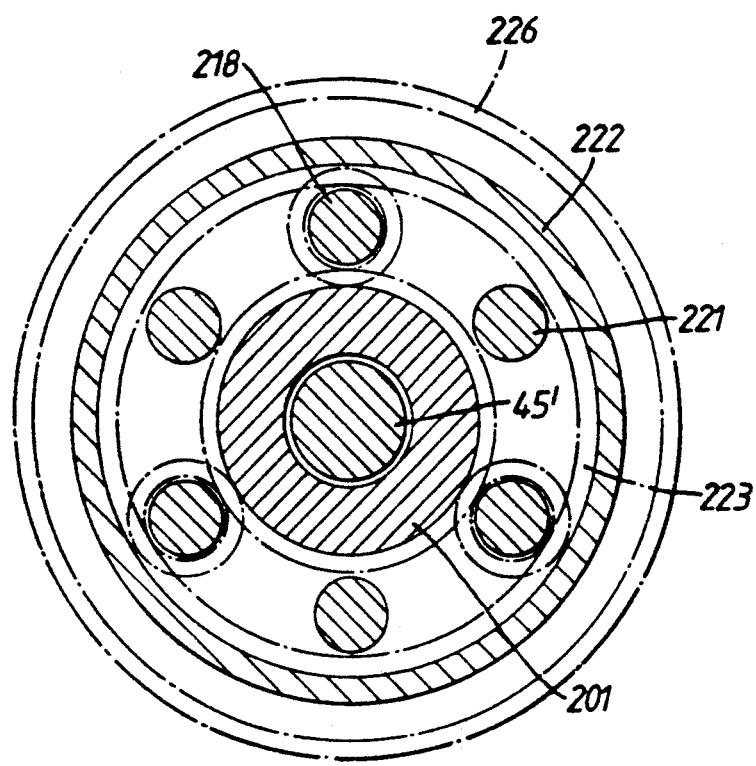

One form of actuating mechanism in accordance with the invention will now be described, by way of example, with reference to the accompanying drawings, in which:

FIG. 1 is an axial cross-section of the mechanism; and
FIG. 2 is a cross section in the line II—II of FIG. 1

In the construction illustrated, the primary drive member is constituted by an end component 13 rotationally fast in use with a crankshaft of which it forms part, and the secondary shaft 45 by an operating shaft running co-axially through the crankshaft for adjusting the eccentricity of connecting-rods mounted on the crankshaft, as described in the above mentioned application.

Secured to the shaft 45 is a separately formed extension shaft 45' which supports a sun gear 201 by plain bearings 202 and whose outer, right hand end is supported by tapered roller bearings 203 in an end closure member 204, removably secured to a main casing 206.

Secured to the end component 13 is a primary cage for a set of planet gears 208. The cage comprises first and second end-pieces 210, 211 preferably of phosphor bronze, secured together by spacers 212. Three planet gears 208 are rotatably supported by their ends in the end-pieces and mesh, on the one hand with the sun gear 201, and on the other hand with an internal ring gear 213 formed in a primary gear casing 214 having a radial lug 216 engaged in a keyway 217 formed in the main casing 206 to lock the gear casing 214 against rotation. Thus, the primary cage rotates with the crankshaft, relative to sun gear 201 and to the gear casing 214.

A secondary cage for a secondary set of planet gears 218 is similarly fabricated from opposite end pieces 219, 220 and spacers 221. The planet gears mesh with the sun gear 201 and with an internal ring gear 223 formed in a secondary gear casing 222 within which the secondary cage is mounted for rotation. The outer (right-hand) end piece 220 is carried by and keyed to the extension shaft 45' and carries a plain bearing 224 for support of the secondary gear casing 222. The casing 222 is formed with an external ring gear 226 coupled in use to an actuator input (not shown), which normally holds the casing 222 against rotation.

With the casing 222 held against rotation, the shafts 45 and 45' rotate at the same speed as the crankshaft and the two gear cages rotate in unison, since the gearing between the sun, planet and ring gearing is identical in both sets of gears. Angular adjustment of the secondary casing 222 and thus of the internal ring gear 223 can be effected while the crankshaft and the shafts 45, 45' are running, and has the effect of displacing the secondary cage through a corresponding angle relative to the first cage by superimposing an additional rotation to the planet gears through the ring gear. Thus, during adjustment, the cages continue to rotate with the crankshaft but there is a temporary and very small acceleration or deceleration of the shaft 45' relative to the crankshaft.

Because of the gearing, only a relatively light load has to be applied to the secondary gear casing, through its external gear 226, to hold it stationary for normal operation, or to displace it for operation of the adjustment mechanism.

The input drive to the gear 226 is applied through a pinion, not shown, which may be driven automatically or, if appropriate, manually.

I claim:

1. An actuating mechanism for adjusting he angular relationship of co-axial primary and secondary drives while both are driven in unison, the mechanism comprising a primary and a secondary planetary gear train, each train comprising a set of planet gears mounted in a cage and inner and outer concentric gears comprising a sun gear and a ring gear, the planet gears engaging the sun gear and the ring gear in that train, and wherein the primary and secondary drive are fast with the respective said cages of the primary and secondary gear trains, and one concentric gear of each train is fast with the corresponding concentric gear of the other train to form a gear unit which is freely rotatable, while the other concentric gears of the trains are normally held against rotation, one of them being angularly adjustable relative to the other during operation to transmit a corresponding angular adjustment to the secondary drive.

2. A mechanism according to claim 1, wherein the sun gears are fast with each other to form a sun gear unit which is freely rotatable, the ring gear of the primary train is fixed against rotation and the ring gear of the secondary train is angularly adjustable relative thereto.

* * * * *